Oct. 2, 1962 O. JUNKER 3,056,847
VACUUM MELTING INDUCTION FURNACE
Filed April 8, 1959 2 Sheets-Sheet 1

INVENTOR:
OTTO JUNKER,
BY
HIS ATTORNEY.

Oct. 2, 1962  O. JUNKER  3,056,847
VACUUM MELTING INDUCTION FURNACE
Filed April 8, 1959  2 Sheets-Sheet 2
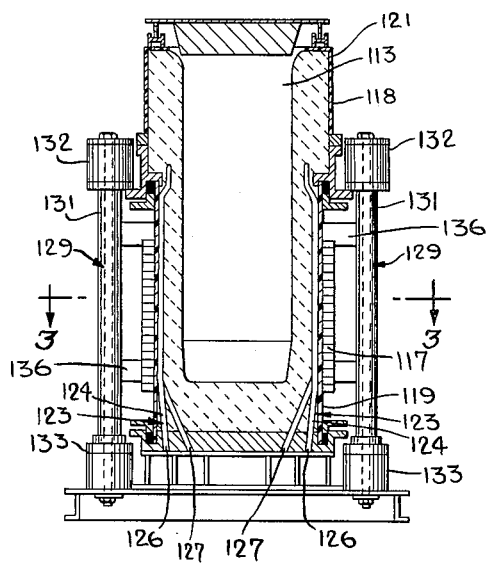
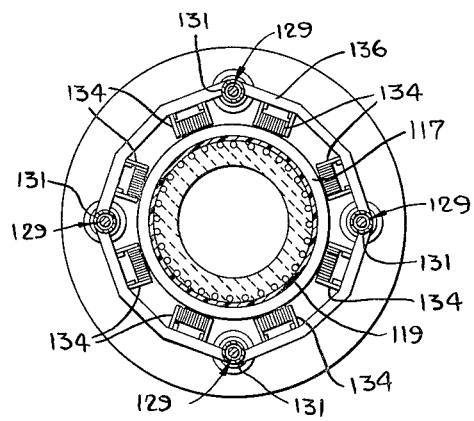
INVENTOR:
OTTO JUNKER,
BY
*Ernest P. Marmorek*
HIS ATTORNEY.

United States Patent Office 3,056,847
Patented Oct. 2, 1962

3,056,847
VACUUM MELTING INDUCTION FURNACE
Otto Junker, (22c) Lammersdorf uber Aachen 1, Germany
Filed Apr. 8, 1959, Ser. No. 804,907
Claims priority, application Germany Apr. 12, 1958
5 Claims. (Cl. 13—27)

The invention relates to coreless induction furnaces for melting under a vacuum, and relates more particularly to furnaces of this type of large capacity having the parts under rarefied air remote from the induction heating equipment.

To melt metal under rarefied atmospheric conditions has many advantages among which there is the removal of gaseous substances from the surface of the metal bath. Similarly, melting in coreless induction furnaces has been found to have many advantages.

The use of induction furnaces appears particularly attractive for vacuum melting because, in induction melting, gases are constantly moved from the interior of the metal bath to the surface where they can be removed by the prevailing vacuum, so that the combination would increase the advantages of vacuum melting furnaces which remove gases only from the surface of the metal bath.

Attempts to combine these features and hence their advantages have not met with much success, as the designers of the prior art, except for very small capacity furnaces, have brought the primary induction coil within the space of rarefied air, resulting in unwieldy and cumbersome structures.

In connection with small capacity furnaces, however, attempts have been made to locate the primary induction coil outside of the receptacle under reduced pressure. The reason for this is that the receptacle must be made of material that is electrically nonconducting and mechanically resistant even at elevated temperatures. The designers of the prior art apparently were unable to do the same for large capacity furnaces, probably for the reason that materials used in small furnaces such as quartz, glass or porcelain were unsuitable for large furnaces. The lack of mechanical resistance becomes particularly troublesome where large capacity furnaces are set up for a network frequency of 50 or 60 cycles, since these require the taking up of large mechanical forces.

It is accordingly among the object of the instant invention to combine the advantages of a coreless network frequency induction furnace for large capacity for vacuum melting. It is a further object of the invention to provide for such a furnace in which a gas impermeable partition or wall is put between the primary induction coil and the crucible under vacuum. It is still another object of the invention to provide such a furnace in which this partition interconnects gas impermeably the upper and lower parts of the furnace. It is still another object of the invention to provide for cooling of that partition. It is yet another object of the invention to reinforce the partition so as to render the furnace resistant to even large mechanical forces applied.

Further objects and advantages of the invention will be set forth in part in the following specification and in part will be obvious therefrom without being specifically referred to, the same being realized and attained as pointed out in the claims hereof.

For a fuller understanding of the nature and objects of the invention, reference should be had to the following detailed description, taken in connection with the accompanying drawings, in which:

FIG. 2 is a vertical sectional view, similar to FIG. 1 though on a smaller scale and embodying a modification; and FIG. 3 is a horizontal sectional view taken on the line 3—3 of FIG. 2.

Figure 1:
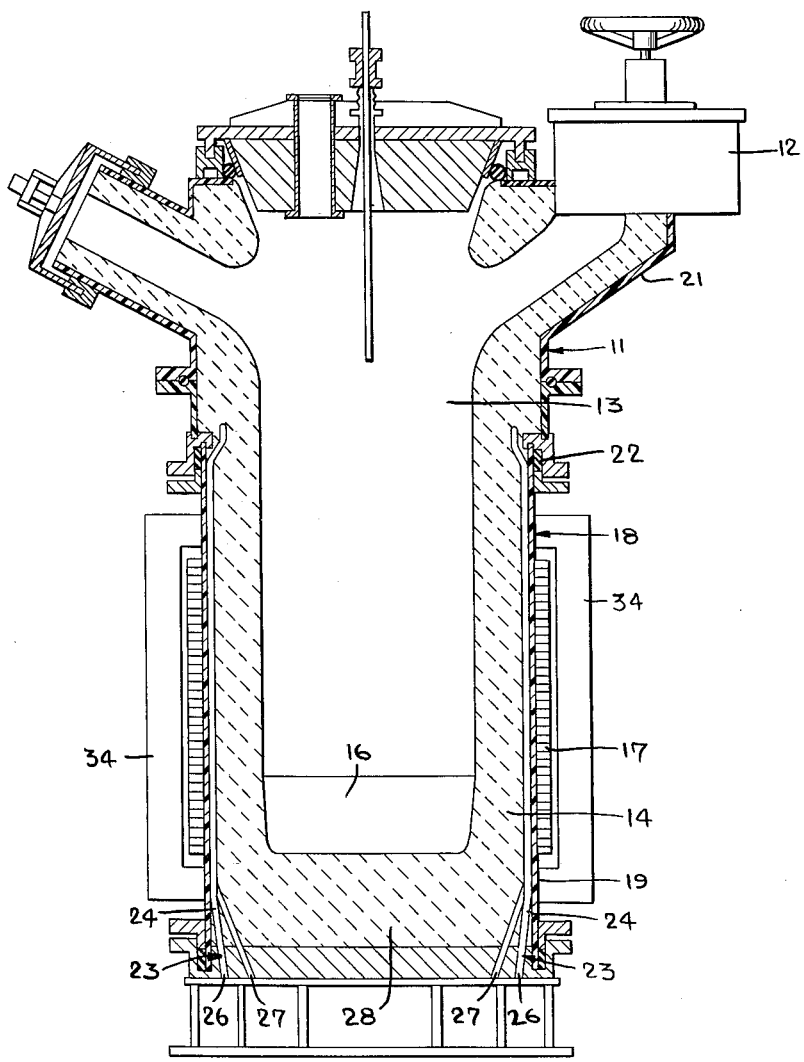
FIG. 1 is a vertical sectional view of a furnace in accordance with an embodiment of the invention.

In carrying the invention into effect in the embodiments which have been selected for illustration in the accompanying drawings and for description in this specification, and referring now particularly to FIG. 1, there is provided a vacuum metal melting furnace generally indicated at 11 which has means 12 of well known suitable design to effect and to maintain a rarefied atmosphere or substantial vacuum within the crucible 13 of the furnace. The crucible 13 is lined with a refractory material 14 in which there is located the metal bath 16. Surrounding the lower portion of the furnace 11 is a primary induction coil 17 which may be connected (not shown) to a network line of alternating electric current, for instance of a frequency of 50 or 60 cycles, and the windings of which may be circulated interiorly (not shown) by a coolant fluid.

Between the crucible 13 and the primary coil 17 there is provided a wall 18 which is composed of a gas impermeable material of low electrical conductivity, for instance stiff plastic with or without a fabric type reinforcement. The wall 18 has two parts, namely a lower wall part 19 that surrounds the lower portion of the crucible 13, and an upper wall part 21 that surrounds the upper portion of the crucible 13. Sealing means including gasket means 22 are provided to interconnect the lower and upper wall parts 19 and 21 gas tightly.

In order to shield the wall 18, particularly the lower wall part 19 against unsuitably high temperatures, there is provided a shielding means 23, for instance a series of cooling tubes 24 that are disposed on the internal surface of the wall 18. Cooling fluid is circulated in the tubes 24, for instance pressurized cold air or any other suitable gas or liquid.

Preferably, the tubes 24 are arranged parallel of the axis of the wall 18 and close to each other with the inlet portions 26 and the outlet portions 27 thereof protruding at the same end, for instance the lower end as shown in FIG. 1. Laminated yokes are shown at 34.

In accordance with a preferred embodiment, the means to discharge metal from the crucible 13 include a conical taper (not shown) formed in the bottom portion 28 of the crucible 13, for discharge downwardly through said bottom portion. This mode of discharge has the advantage that it dispenses with any need for tilting the furnace including all the vacuum equipment.

In the modification shown in FIGS. 2 and 3, the crucible 113 has again a wall 118 and a shielding system 123 formed of tubes 124 with inlets 126 and outlets 127. The primary coil is designated 117. The modification, however, provides for reinforcement of the wall 118. There is provided a structure 129 that is composed of columns 131 that are connected by means of an annular connection 132 to the upper wall part 121, and by means of an annular connection 133 with relation to the lower wall part 119.

As best shown in FIG. 3, the columns 129 offer the further advantage that the customary laminated ferromagnetic yokes 134 of the furnace may be connected by means of members 136 to the columns 129 for a general reinforcement of the entire furnace.

In the following, an example is given:

A furnace of the above described type has been charged with about two thousand pounds of low carbon content unalloyed steel and the charge subjected to melting in the furnace. About one-half of the charge was then discharged from the crucible, and the remainder subjected to vacuum treatment for about twenty-five minutes at a rarefication of 0.5 Torr. The vacuum molten part of the charge appeared absolutely quiet. The amount of electric current used was 900 kwh. per ton. Larger units are expected to have a better efficiency, but it could be ascertained already with this batch that the network frequency was beneficial for degassing by means of vacuum.

Certain advantages have already been alluded to, but certain other advantages may be mentioned as follows:

There appears to be no need for any special shielding of the coil, facilitating inspection of the coil for any defects. For a higher efficiency, a larger coil voltage may be used, because no insulation of the coil against metal vapors or metal spray is necessary with the instant invention. Lastly, all the current leads and bus bars may be arranged in a fixed manner, there being no need for any insulation gaskets.

These advantages add up to a far greater safety in operation, as will be obvious to the skilled artisan.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. A coreless induction furnace for large capacity vacuum melting, said furnace including an upper part and a lower part and comprising in combination, a crucible extending from said lower part into said upper part, a primary induction coil adapted to be fed from an electric source and disposed in the lower furnace part surrounding said crucible defining with said crucible a vertical annular space, a sleeve including gas impermeable plastic material of low electrical conductivity disposed in said space including an upper portion in the upper furnace part and a lower portion in the lower furnace part, said upper and lower sleeve portions being interconnected gastightly, gastight closures operable for airtightly closing the upper and lower ends of the sleeve, said sleeve and closures defining a vacuum chamber housing said crucible, cooling means for said sleeve disposed adjacent the inner surface of at least the lower portion of said sleeve and comprising a series of elongated bent cooling tubes disposed axially of the sleeve and close to each other and fluid cooled internally, each tube being sharply bent about itself having an ascending and descending branch, and support means including said sleeve operable to take up the weight of the upper furnace part throughout.

2. A furnace as claimed in claim 1, together with, said support means including a series of upright columns placed about the exterior of the lower furnace part and secured to the upper furnace part for supporting the upper furnace part, a plurality of upright laminated ferromagnetic yokes spaced throughout about the lower part of the furnace and operable to direct the return flux of the magnetic lines of force externally around the coil, and means interconnecting said yokes with said columns.

3. A furnace as claimed in claim 1, said cooling tubes having inlets and outlets for said cooling fluid adjacent each other.

4. A furnace as claimed in claim 3, said cooling fluid for said tubes being air circulated on the interior of said tubes, said inlets and outlets of said cooling tubes being disposed near the bottom of said sleeve.

5. A furnace as claimed in claim 1, said support means including means disposed on the exterior of the lower furnace part and secured to the upper furnace part.

References Cited in the file of this patent

UNITED STATES PATENTS

| | | |
|---|---|---|
| 1,328,336 | Northrup | Jan. 20, 1920 |
| 1,782,359 | Linnhoff | Nov. 18, 1930 |
| 1,810,820 | Davis et al. | June 16, 1931 |
| 1,823,908 | Long | Sept. 22, 1931 |
| 1,931,607 | Halasz | Oct. 24, 1933 |
| 2,400,660 | Strickland | May 21, 1946 |

FOREIGN PATENTS

| | | |
|---|---|---|
| 439,590 | Great Britain | Dec. 10, 1935 |
| 1,042,787 | Germany | Nov. 6, 1958 |